Patented Mar. 4, 1941

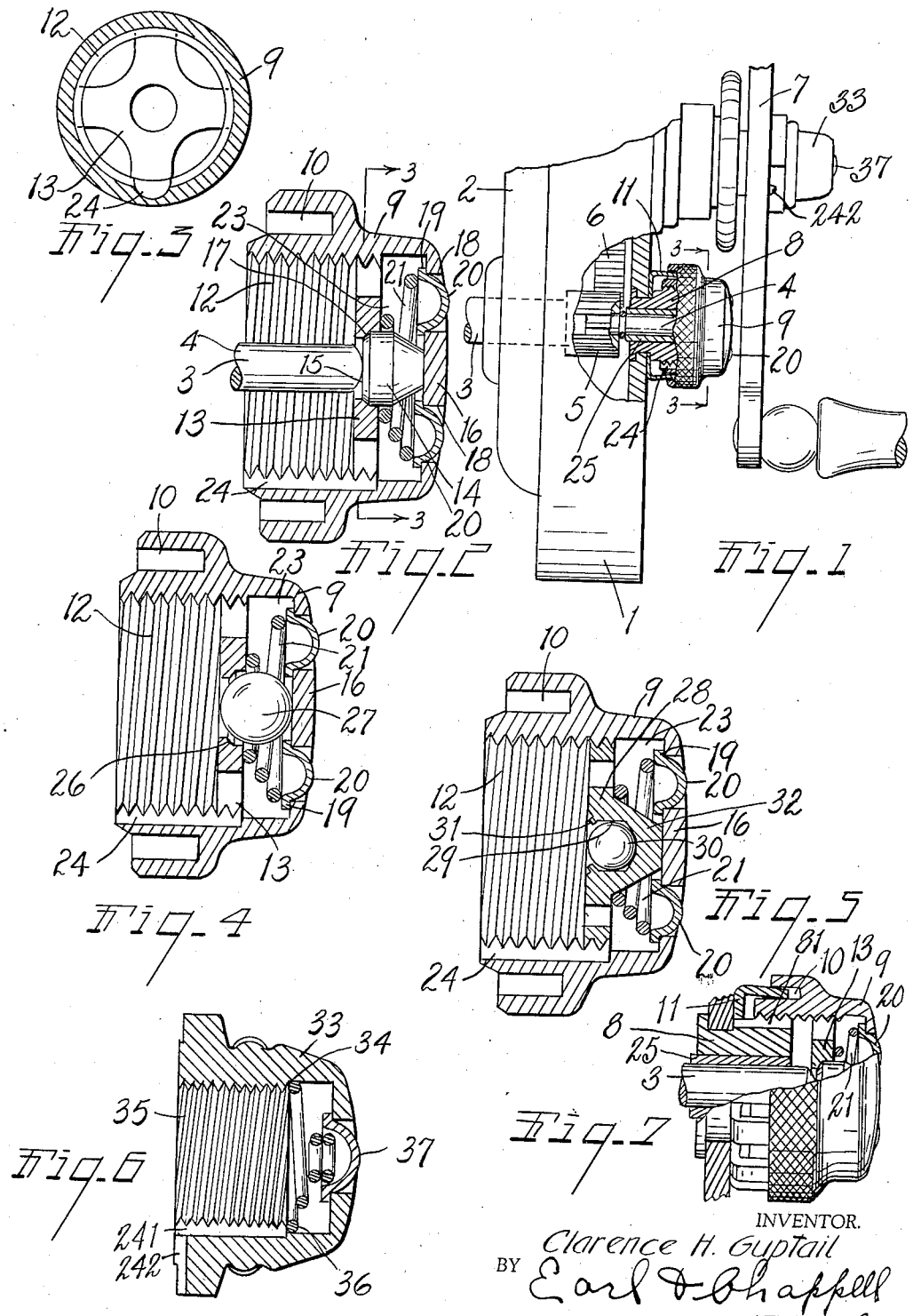

2,233,525

UNITED STATES PATENT OFFICE 2,233,525

FISHING REEL

Clarence H. Guptail, Oshtemo Township, Kalamazoo County, Mich., assignor to Shakespeare Company, Kalamazoo, Mich., a corporation of Mich Application September 11, 1939, Serial No. 294,283

11 Claims. (Cl. 308—163)

This invention relates to improvements in fishing reels.

The main objects of this invention are:

First, to provide an improved combined lubricating and end thrust bearing means for the shafts of fishing reels, such for example as the spool shaft.

Second, to provide in a fishing reel an improved end thrust bearing structure which permits the use of a hardened end thrust bearing element of relatively small dimensions and properly supports the same in relation to the shaft with which it coacts.

Third, to provide a bearing cap for fishing reels which is adjustable to regulate the end play of the shaft supported by the bearing and provided with efficient means for shaft lubrication and facilitating the introduction of lubricant.

Objects pertaining to details and economies of my invention will definitely appear from the description to follow. The invention is defined in the claims.

A structure which embodies the features of my invention is clearly illustrated in the accompanying drawing, in which:

Fig. 1 is a fragmentary view partially in section illustrating details of my improvements as embodied in a fishing reel in association with the spool shaft thereof.

Fig. 2 is an enlarged view of the bearing cap removed from the bearing and partially in longitudinal section, the shaft and its thrust bearing being shown in full lines.

Fig. 3 is a transverse section on line 3—3 of Figs. 1 and 2.

Fig. 4 is an enlarged longitudinal section of the bearing cap removed from the bearing, the ball type thrust bearing element being shown in full lines.

Fig. 5 is an enlarged longitudinal section of the bearing cap showing a modified form of supporting spider or bridge member in which a ball type of thrust bearing member is provided.

Fig. 6 is a longitudinal section of an embodiment of my invention in which the thrust bearing is omitted.

Fig. 7 is a fragmentary sectional view of another modification or embodiment of my invention.

It will be understood that in the accompanying drawing the parts are very much enlarged in all of the views as compared to actual sizes in a fishing reel. It will also be understood that no effort has been made to show the parts in commercial proportions.

Referring to the drawing, 1 represents the head or gear box end of a fishing reel frame, 2 the spool, and 3 the shaft thereof. The shaft has a reduced spindle portion 4 receiving the spool pinion 5 which meshes with the driving gear 6 associated with the crank 7. The details of these parts are not further illustrated as they will be understood by those skilled in the art.

The shaft 3 is supported on the frame by means of the bearing 8 which is externally threaded to receive the bearing cap 9. This bearing cap is provided with an annular inwardly facing channel or recess 10 receiving the friction element 11 for holding the cap in its adjusted positions. The cap 9 has internal threads 12 coacting with the threads of the bearing 8 for threaded adjustment thereon and also to receive the combined thrust bearing and spring supporting spider or support member 13.

In the embodiment of Figs. 1 to 3 the thrust bearing member 14 is in the form of a cylindrical block having a flat bearing face 15 presented to the spool shaft 3 as shown in Fig. 2. The support member 13 is threaded into the cap to clampingly hold the outer end of the thrust bearing member 14 against the end 16 of the cap. The support is provided with an outwardly facing seat 17 for the thrust bearing member so that the thrust bearing member is accurately located and firmly supported to receive the thrust of the shaft and to be adjusted axially of the shaft.

The bearing member 14 is preferably formed of some material highly resistant to wear or from material suitably hardened to resist wear.

The cap is provided with oil openings 18 disposed in substantially spaced relation. The closure disk 19 is provided with semi-spherical portions 20 which are struck up preferably in a sheet metal disk, these portions 20 extending into the openings 18 to effectively close the same and also constitute means for locating the disk which is floatingly supported by the helically coiled conical spring 21. This spring is arranged with its smaller end seated upon the member 13 and laterally positioned thereby, and its outer end in engagement with the closure.

It is difficult to introduce lubricant into the cap owing to its small dimensions, even when a pair of oil openings are provided, one serving as a vent while oil is being introduced into the other end. To thoroughly vent the space 23 at the outer side of the member 13 I provide a longitudinal venting groove 24 which is cut through the threads as shown in the drawing and opens to the space 23. This makes it possible to introduce a sufficient quantity of lubricant to effectively lubricate the bearing. In the embodiment illustrated the bearing is provided with a bushing 25.

In the embodiment shown in Fig. 4 the seat 26 of the thrust bearing support 13 is suitably shaped to receive the ball thrust bearing member 27. This, however, is not intended to be rotatively supported.

In the embodiment shown in Fig. 5 the spider or thrust bearing member support 28 is provided with an inwardly facing recess 29 adapted to receive the thrust ball bearing member 30, the walls of the recess being struck inwardly at 31 to provide a retainer for the thrust bearing member 30. In this case the bearing member could rotate but ordinarily it does not rotate. The central conical projecting portion 32 of the support 28 engages the end of the cap and it also serves to position and laterally support the closure spring 21.

In the embodiment of certain features of my invention to the cap 33 for the crank spindle, the cap as shown in Fig. 6 is formed with a shoulder 34 at the inner end of its threads 35. This cap is adapted to form a supporting seat for the large end of the helically coiled conical spring 36. The smaller end of this spring engages within the cupped closure member 37. No thrust bearing is required in this relation. The ventilating passage 241 corresponding to the ventilating passage 24 is provided with a lateral opening 242 opening to the passages 241 inasmuch as in this embodiment the cap abuts the side of the crank.

In the embodiment shown in Fig. 7, the vent passage 81 is formed in the bearing member 8 instead of in the cap, securing substantially the same result insofar as venting the cap to facilitate introduction of lubricant is concerned. I, however, have found the forming of the venting groove in the internally threaded cap to be the most practical and satisfactory as the groove can be broached into the threads as illustrated.

I have illustrated and described my invention in embodiments which I have found to be very practical. I have not illustrated and described certain modifications which I contemplate as it is believed this disclosure will enable those skilled in the art to embody or adapt my invention as may be desired.

Having thus described my invention, what I claim as new and desire to secure by Letters Patent is:

1. In a fishing reel, the combination with the frame, of a shaft and externally threaded bearing for said shaft carried by said frame, an internally threaded cap adjustably threaded on said bearing and provided with spaced oil openings in the end thereof, a closure disk arranged within said cap and provided with semi-spherical portions engaged within said oil openings, a thrust bearing member support threaded into said cap and having an outwardly facing seat for said thrust bearing member, said support being adjusted to hold said thrust bearing member against the end of the cap, and a helically coiled conical spring seated on said support with its smaller end embracing said thrust bearing member and laterally positioned thereby and its larger outer end in supporting engagement with said closure.

2. In a fishing reel, the combination with the frame, of a shaft and externally threaded bearing for said frame, an internally threaded cap adjustably threaded on said bearing and provided with an oil opening in the end thereof, a closure disk arranged within said cap to coact with said oil opening, a thrust bearing member support threaded into said cap and having an outwardly facing seat for said thrust bearing member, said support being adjusted to hold said thrust bearing member against the end of the cap, and a spring seated on said support in supporting engagement with said closure, one of said threaded members having an internal longitudinal groove extending through the threads thereof and constituting a vent passage in communication with the cap at the outer side of said thrust bearing member support.

3. In a fishing reel, the combination with the frame, of a shaft and externally threaded bearing for said shaft carried by said frame, an internally threaded cap adjustably threaded on said bearing and provided with an oil opening in the end thereof, a closure disk arranged within said cap to coact with said oil opening, a thrust bearing member support threaded into said cap and having an outwardly facing seat for said thrust bearing member, said support being adjusted to hold said thrust bearing member against the end of the cap, and a spring seated on said support in supporting engagement with said closure.

4. In a fishing reel, the combination with the frame, of a shaft and a bearing for said shaft carried by said frame, a cap adjustably threaded on said bearing and provided with spaced oil openings in the end thereof, a closure disk arranged within said cap, a thrust bearing member support threaded into said cap, and a helically coiled conical spring seated on said support with its smaller end embracing said thrust bearing member and laterally positioned thereby and its larger outer end in supporting engagement with said closure.

5. In a fishing reel, the combination with the frame, of a shaft and an externally threaded bearing for said shaft carried by said frame, an internally threaded cap adjustably threaded on said bearing and provided with an oil opening in the end thereof, a closure disk arranged within said cap, a thrust bearing member support threaded into said cap, and a spring seated on said support in supporting engagement with said closure, one of said threaded members having a longitudinal groove extending through the threads thereof and constituting a vent passage in communication with the cap at the outer side of said thrust bearing member support.

6. In a fishing reel, the combination with the frame, of a shaft and a bearing for said shaft carried by said frame, a cap adjustably threaded on said bearing and provided with an oil opening in the end thereof, a closure disk arranged within said cap, a thrust bearing member support threaded into said cap, and a spring seated on said support in supporting engagement with said closure.

7. An end thrust bearing device for a fishing reel shaft provided with a projecting threaded bearing, a threaded cap engageable with said bearing for axial adjustment of the cap thereon, said cap having an oil opening therein, an abutment member on said cap, a sheet metal closure element having a projection for engaging and closing said opening, and means for urging said closure element to closing position comprising a coil spring engaging said element behind said projection and said abutment member, one of said threaded members having an axially extending groove therein for venting the same and facilitating oiling.

8. An end thrust bearing device for a fishing reel adapted to be mounted on a fishing reel shaft bearing for end engagement with a shaft carried by said bearing, said device comprising a cap having internal threads engageable with said bearing for axial adjustment of the cap thereon, an end thrust element carried by said cap for axial thrust engagement by said shaft, and an apertured spider secured internally of said cap and adapted to engage and restrain said thrust bearing element.

9. In a fishing reel, the combination with a frame thereof, of a threaded bearing, a coacting threaded cap on said bearing provided with an oil opening at its outer end, and a spring seated closure for said opening, one of said threaded members having a longitudinal internal groove constituting a venting opening for the outer end of said cap.

10. In a fishing reel, the combination with a frame, of a threaded bearing carried by said frame, a coacting threaded cap on said bearing provided with an oil opening at its outer end, and a spring seated closure for said opening, said cap having a longitudinal internal groove constituting a venting opening for the outer end of said cap.

11. In a fishing reel, the combination with a frame, of a threaded bearing carried by said frame, a coacting threaded cap on said bearing provided with an oil opening at its outer end, and a spring seated closure for said opening, said bearing having a longitudinal groove constituting a venting opening for the outer end of said cap.

CLARENCE H. GUPTAIL.